United States Patent
Shaffer et al.

(10) Patent No.: US 6,538,202 B1
(45) Date of Patent: Mar. 25, 2003

(54) APPARATUS AND METHOD FOR COVERING ELECTRICAL OUTLET BOXES PRIOR TO SHEETROCKING

(76) Inventors: Douglas R. Shaffer, 16175 Gollihar Rd., Peyton, CO (US) 80831; Randy J. Humphrey, 5403 E. Courtney Ave., Castlerock, CO (US) 80104

( * ) Notice: Subject to any disclaimer, the term of this patent is extended or adjusted under 35 U.S.C. 154(b) by 0 days.

(21) Appl. No.: 09/408,203

(22) Filed: Sep. 29, 1999

(51) Int. Cl.[7] ................................................. H02G 3/14
(52) U.S. Cl. ........................ 174/66; 174/67; 220/241; 220/242; 29/729
(58) Field of Search ...................... 174/66, 67; 220/241, 220/242, 3.8; 29/729, 772; 33/528, DIG. 10

(56) References Cited

U.S. PATENT DOCUMENTS

| | | | | |
|---|---|---|---|---|
| 2,492,115 A | * | 12/1949 | Crowther | 174/66 X |
| 2,775,812 A | * | 1/1957 | Mohr | 29/407.1 |
| 3,437,737 A | * | 4/1969 | Wagner | 174/66 X |
| 3,823,754 A | * | 7/1974 | Nix | 144/372 |
| 3,953,933 A | * | 5/1976 | Goldstein | 220/242 X |
| 4,202,388 A | * | 5/1980 | Wieting | 144/353 |
| 4,263,472 A | * | 4/1981 | Maheu | 174/51 |
| 4,718,802 A | * | 1/1988 | Rockenfeller et al. | 411/421 |
| 5,219,250 A | * | 6/1993 | Voorsheen | 407/34 |
| 5,221,814 A | * | 6/1993 | Colbaugh et al. | 174/66 |
| 5,675,125 A | * | 10/1997 | Hollinger | 220/241 X |
| 5,736,673 A | * | 4/1998 | Lee | 174/60 X |
| 5,902,960 A | * | 5/1999 | Smith | 174/66 |
| 5,929,379 A | * | 7/1999 | Reiner et al. | 174/66 |
| 6,033,170 A | * | 3/2000 | Gold | 411/480 |
| 6,101,731 A | * | 8/2000 | Mesa | 33/528 |

* cited by examiner

Primary Examiner—Dean A. Reichard
Assistant Examiner—Dhiru R Patel
(74) Attorney, Agent, or Firm—G. F. Gallinger

(57) ABSTRACT

A cover for an electrical outlet box which eliminates the step of cleaning mud, dust, and paint from within the electrical outlet box and from on the made up wires within the electrical outlet box. The cover has a frontal opening, a sidewall surrounding the frontal opening, and opposite screw openings, comprising: a front side portion, a rear side portion, and a peripheral edge portion dimensioned to cover the frontal opening; and, two pegs which extend rearwardly from the rear side portion of the cover, positioned and sized to matingly seat within the screw openings so that the cover may be held over the central opening. In a preferred embodiment of the invention the cover further includes an inwardly recessed central portion, said central portion having an outwardly extending rib so that the cover may be pulled forwardly off the outlet box thereby. The recessed central portion has a rearwardly extending sidewall, opposite portions of which are sized to fit tightly within the interior frontal opening of the electrical outlet box so that the cover may be positioned and secured over the frontal opening thereby.

15 Claims, 2 Drawing Sheets

APPARATUS AND METHOD FOR COVERING ELECTRICAL OUTLET BOXES PRIOR TO SHEETROCKING

FIELD OF INVENTION

This invention relates to labor saving apparatuses used in residential construction. More particularly this invention relates to an apparatus used to cover electrical outlet boxes, and a method of wiring and sheetrocking around electrical outlet boxes which eliminates the step of cleaning mud, dust, and paint from within the electrical outlet box and from on the made up wires within the electrical outlet box.

BACKGROUND OF THE INVENTION

The applicant is an electrician who has worked in residential construction. After electricians mount electrical boxes, run electrical cable between the boxes, and then strip and make up the wires in the boxes in preparation for connection to the electrical devices to be installed in the boxes; they are temporarily finished until the sheetrock is completed. When the sheetrock is initially hung openings in the sheetrock are reamed out around the electrical outlet boxes. The sheetrock is then taped, muded, and sanded. Mud is applied to fill the openings between the boxes and the sheetrock. After the sheetrock is completed the electricians must finish by installing electrical devices (usually outlet receptacles and switches) in the outlet boxes. But first all mud must be cleaned from the outlet boxes. The mud must be removed from the wires so that they are free and clean to work with. Dust should also be removed because it impairs the integrity of the electrical connections.

OBJECTS AND STATEMENT OF INVENTION

It is an object of this invention to disclose an improved method for wiring and sheetrocking around electrical outlet boxes. The apparatus and method eliminate the step of cleaning mud, dust and possibly paint from within the electrical box and from on the made up wires in the box. It is yet a further object of this invention to disclose a simple and effective cover for the electrical box—a cover which ensures that mud, dust and paint are kept out of the box, and a cover which can be readily removed if the cover is sealed into the box by mud. It is a final object of this invention to disclose a method and apparatus which can be used on single, double, triple, and quadruple gang boxes, as well as small and large size round electrical outlet boxes, all in both residential and commercial sizes.

One aspect of this invention provides for a cover for an electrical outlet box having a frontal opening, a sidewall surrounding the frontal opening, and opposite screw openings, comprising: a cover member having a front side portion, a rear side portion, and a peripheral edge portion dimensioned to cover the frontal opening; and, holding means to position and secure the cover over the frontal opening.

Another aspect of this invention provides for a cover as above wherein the holding means comprises two pegs which extend rearwardly from the rear side portion of the cover, positioned and sized to matingly seat within the screw openings of the electrical outlet box.

In a process of wiring and sheetrocking around electrical boxes having the steps of, positioning and fastening the outlet boxes along the wall; interconnecting the outlet boxes with electrical cable; stripping and making up the ends of the electrical cable in preparation for connection to an electrical device to be subsequently installed within the outlet boxes; and then, covering a side portion of the wall with sheetrock making openings therein for the electrical outlet boxes; and finally applying mud to and finishing the wall; another aspect of this invention comprises an improvement to this method comprising the additional steps of: fitting and securing the cover over the electrical outlet boxes before mud is applied to the wall so that the contents of the electrical box are unexposed to mud, dust and paint; and finally, removing the cover before electrical devices are installed within the electrical outlet boxes.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figure 1:
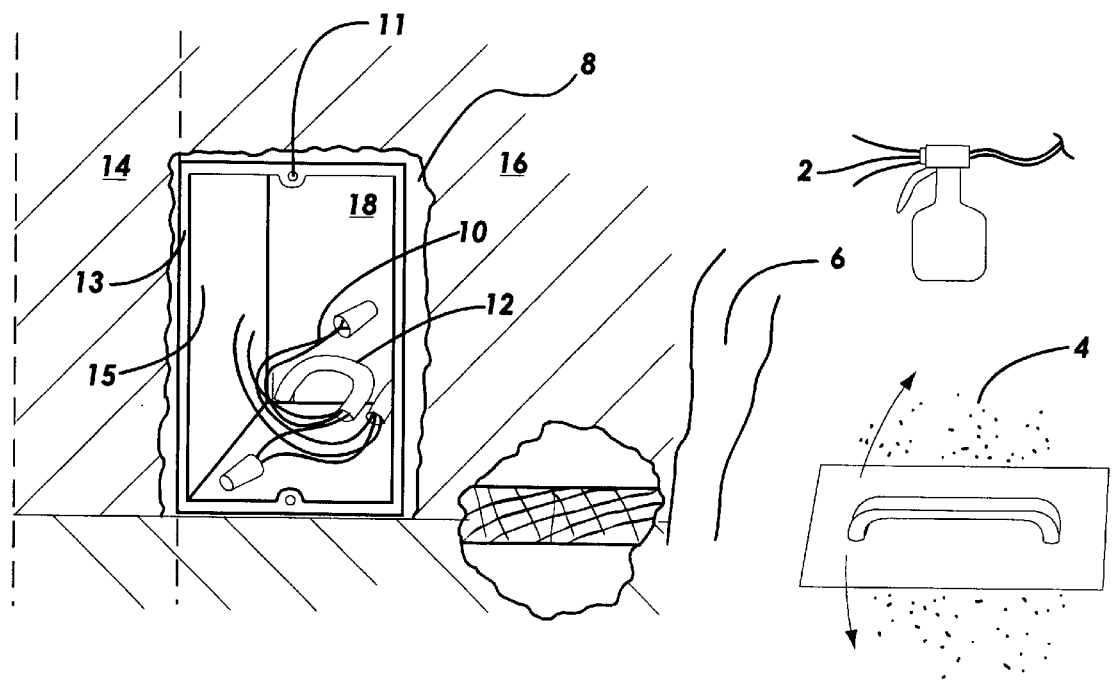
FIG. 1 is a perspective view of an electrical outlet box fastened in a wall covered by sheetrock.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of an electrical outlet box 18 fastened in a wall 14 covered by sheetrock 16. The process of wiring and sheetrocking around electrical boxes 18 normally has the steps of, fastening the outlet boxes 18 along the wall 14; interconnecting the outlet boxes with electrical cable 12; stripping and making up the ends 10 of the electrical cable 12 in preparation for connection to an electrical device (not shown) to be subsequently installed within the outlet boxes 18; and then, covering a side portion of the wall 14 with sheetrock 16 making openings 8 therein for the electrical outlet boxes 18; and finally applying mud 6 to and finishing, usually by sanding 4 the wall 14. The improvement to this process comprises the additional steps of: fitting and securing a cover 20 over the electrical outlet boxes 18 before mud 6 is applied to the wall 14 so that the contents of the electrical box 18 are unexposed to mud 6, dust 4 and paint 2; and finally, removing the cover 20 before electrical devices (not shown) are installed within the electrical outlet boxes 18.

Figure 2:
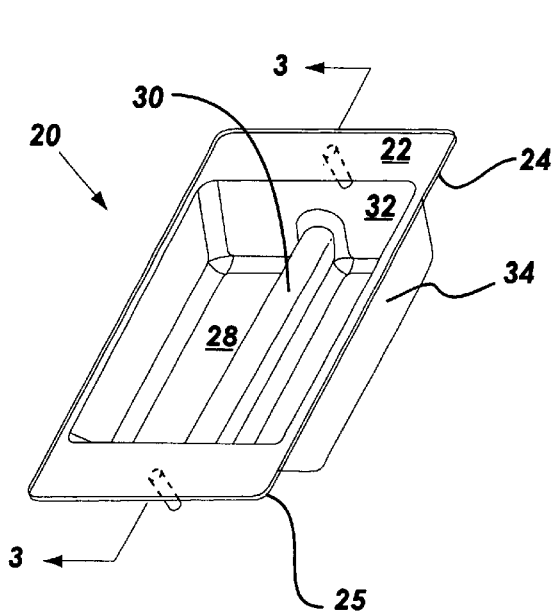
FIG. 2 is a perspective view of a cover for an electrical outlet box.

FIG. 2 is a perspective view of a cover 20 for an electrical outlet box 18. The cover 20 is designed to fit an electrical outlet box 18 which has a frontal opening 15, a sidewall 13 surrounding the frontal opening 15, and opposite screw openings 11. The cover 20 comprises: a front side portion 22, a rear side portion 24, and a peripheral edge portion 25. A holding means 26 is used to position and secure the cover 20 over the frontal opening 15. Most preferably the cover 20 is dimensioned to cover the frontal opening 15 and a front portion of the sidewall 13 surrounding the frontal opening 15.

Figure 3:
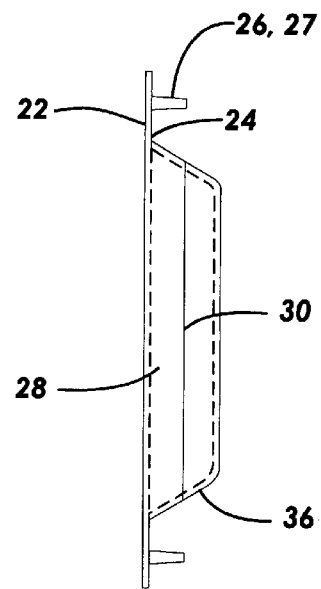
FIG. 3 is a cross sectional view of the cover shown in FIG. 2 taken along line 3—3 therein.

FIG. 3 is a cross sectional view of the cover 20 shown in FIG. 2 taken along line 3—3 therein. FIG. 3 best shows the holding means 26 which preferably comprise two pegs 27 which extend rearwardly from the rear side portion 24 of the cover 20. The pegs 27 are positioned and sized to matingly seat within the screw openings 11. Most preferably the pegs 27 are tapered to facilitate their initial seating in the screw openings 11.

Most preferably the cover 20 further comprises an inwardly recessed central portion 28, said central portion having an outwardly extending protrusion or rib 30 so that the cover 20 may be pulled forwardly off the outlet box 18 thereby. Most preferably the recessed central portion 18 has a rearwardly extending sidewall 32, opposite portions 34 of which are sized to fit tightly within the interior frontal opening 15 of the electrical outlet box 18 so that the cover 20 may be positioned and secured over the frontal opening 15 thereby.

Most preferably an upper and lower side portion 36 of the recessed central portion 28 are sloped so that material (mud 6 or dust 4) in the recessed central portion 28 of the cover 20 will tend to slide out of the cover 20 however the cover 20 is inserted into the frontal opening 15 of the electrical outlet box 18.

Figure 4:
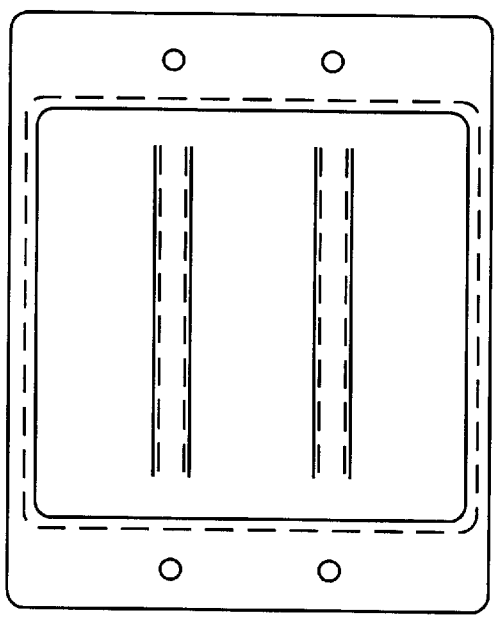
FIG. 4 is a front view of a cover for a 2 gang electrical outlet box.
Figure 6:
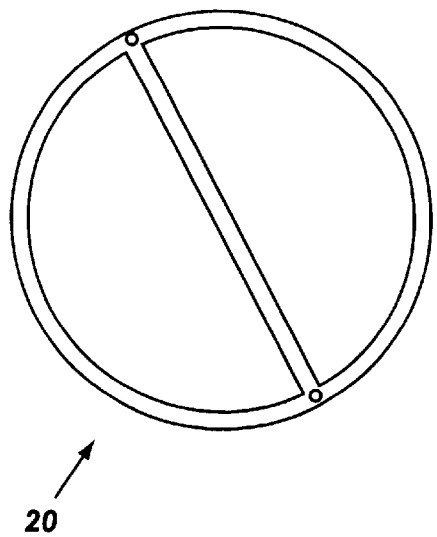
FIG. 6 is a front view of a cover for a round electrical outlet box.
Figure 5:
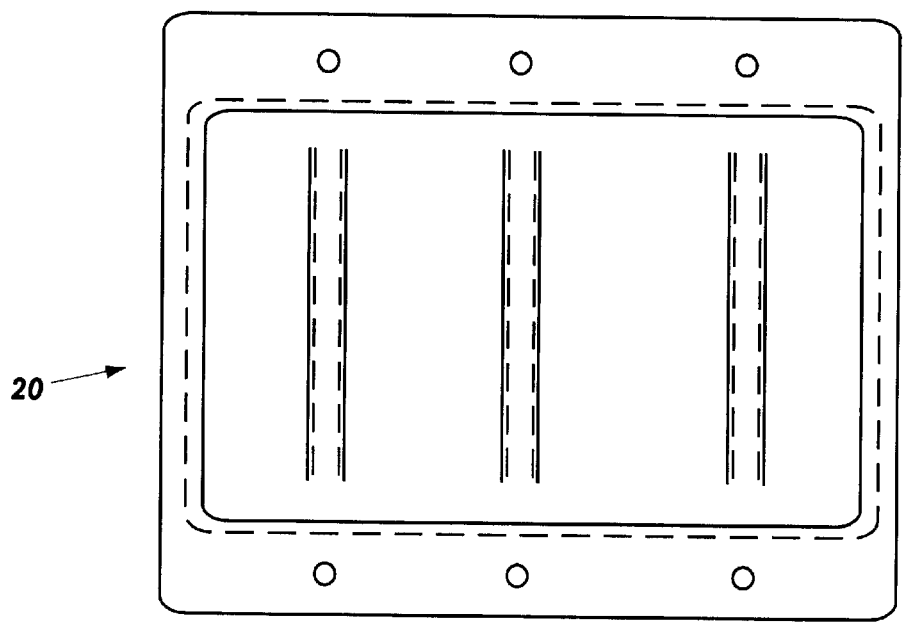
FIG. 5 is a front view of a cover for a 3 gang electrical outlet box.

FIG. 4 is a front view of a cover 20 for a two gang electrical outlet box 18. FIG. 5 is a front view of a cover 20 for a three gang electrical outlet box 18. FIG. 6 is a front view of a cover 20 for a round electrical outlet box 18.

The disclosed design for a cover 20 will fit all electrical outlet boxes 18, whether made of metal or plastic. All rectangular electrical outlet boxes 18 have the same width, and spacings between the screw openings 11; although all do not have the same length or depth.

In the most preferred embodiment of the invention the cover 20 is made of flexible plastic. The plastic is inexpensive enough to be disposable in commercial use and may be cleaned by twisting to release any mud 6 adhered thereto.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

What is claimed is:

1. A cover for an electrical outlet box having a frontal opening, a sidewall surrounding the frontal opening, and opposite screw openings, comprising:

a front side portion and a peripheral edge portion dimensioned to cover the frontal opening and a front portion of the sidewall surrounding the frontal opening; and, holding means to position and secure the cover over the frontal opening; and, an inwardly recessed central portion, said central portion having an outwardly extending protrusion so that the cover may be pulled forwardly off the outlet box thereby.

2. A cover as in claim 1 wherein the holding means comprises two pegs which extend rearwardly from the rear side portion of the cover, positioned and sized to matingly seat within the screw openings.

3. A cover as in claim 2 wherein the pegs are tapered to facilitate their initial seating in the screw openings.

4. A cover as in claim 1 wherein the recessed central portion has a rearwardly extending sidewall, opposite portions of which are sized to fit tightly within the interior frontal opening of the electrical outlet box so that the cover may be positioned and secured over the frontal opening thereby.

5. A cover as in claim 1 wherein an upper and lower side portion of the recessed central portion are sloped so that material in the recessed central portion of the cover will tend to slide out of the cover.

6. A cover as in claim 1 for a rectangular outlet box which is generally rectangular.

7. A cover as in claim 1 for a round outlet box which is generally circular.

8. A cover as in claim 1 wherein the protrusion comprises a rib.

9. A process of wiring and sheetrocking around outlet boxes having the steps of, fastening the outlet boxes along the wall; interconnecting the outlet boxes with electrical cable; stripping and making up the ends of the electrical cable in preparation for connection to an electrical device to be subsequently installed within the outlet boxes; and then, covering a side portion of the wall with sheetrock making openings therein for the electrical outlet boxes; and finally applying mud to and finishing the wall; the improvement comprising the additional steps of:

fitting and securing a cover over one of the outlet boxes before mud is applied to the wall so that the contents of the electrical box are unexposed to mud, dust and paint; and finally, wherein said cover has an inwardly recessed central portion having an outwardly extending protrusion; and, removing the cover off the outlet box cover before electrical devices are installed within the outlet boxes by pulling forwardly on the outwardly extending protrusion.

10. A process as in claim 9 wherein the electrical outlet boxes have a frontal opening, a sidewall surrounding the frontal opening, and opposite screw openings, and wherein the cover is dimensioned to cover the frontal opening and a front portion of the sidewall surrounding the frontal opening.

11. A process as in claim 10 wherein the cover is positioned and secured by two pegs which extend rearwardly from the rear side portion of the cover, positioned and sized to matingly seat within the screw openings.

12. A process as in claim 11 wherein the pegs are tapered to facilitate their initial seating in the openings.

13. A process as in claim 9 wherein the recessed central portion has a rearwardly extending sidewall, opposite portions of which are sized to fit tightly within the frontal opening of the outlet box so that the cover may be positioned and secured over the frontal opening thereby.

14. A process as in claim 13 wherein an upper and lower side portion of the recessed central portion are sloped so that material in the recessed central portion of the cover will tend to slide out of the cover.

15. A method as in claim 9 wherein the outwardly extending protrusion comprises a rib.

* * * * *